3,142,695
HEXACHLOROBICYCLOHEPTENEALKYL ESTERS OF ARYLPHOSPHONIC ACIDS
Robert J. Rolih, Joliet, and Emil F. Jason, Chicago, Ill., assignors to Standard Oil Company, Chicago, Ill., a corporation of Indiana
No Drawing. Filed Aug. 23, 1962, Ser. No. 218,839
3 Claims. (Cl. 260—461)

This invention relates to halogen-containing organophosphorus compounds. More particularly, it relates to a novel class of arylphosphonates containing the hexachloronorbornene nucleus and to compositions containing such arylphosphonates.

The novel arylphosphonates of this invention are adducts of hexachlorocyclopentadiene and dialkenyl arylphosphonates. The structural formulae of these new compounds are represented by Formula I I 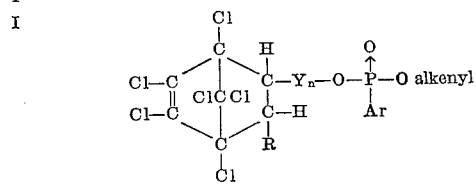

and Formula II

II 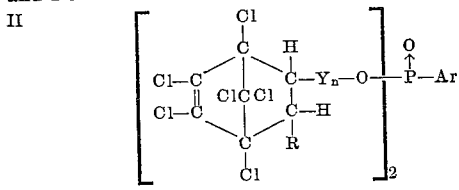

wherein Ar is an aromatic radical, R is from the group consisting of hydrogen and alkyl, Y is a divalent alkylene radical, and $n$ is an integer including zero.

The arylphosphonates containing the hexachloronorbornene nucleus represented by Formula I are the adducts obtained by intermittently mixing substantially equimolar quantities of the hexachlorocyclopentadiene and dialkenyl arylphosphonate reactants. The adducts of Formula II are the reaction products of two moles of hexachlorocyclopentadiene and one mole of the dialkenyl arylphosphonate.

Dialkenyl arylphosphonates broadly represented by the formula

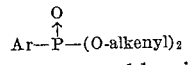

are more specifically represented herein by the formula

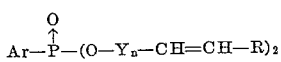

wherein Ar is an aromatic radical, R is from the group consisting of hydrogen and alkyl, Y is a divalent alkylene radical, and $n$ is an integer including zero, or one.

Hence, the adducts of Formulas I and II can be considered to be formed in accordance with the following schematic equations A and B, respectively.

(A)
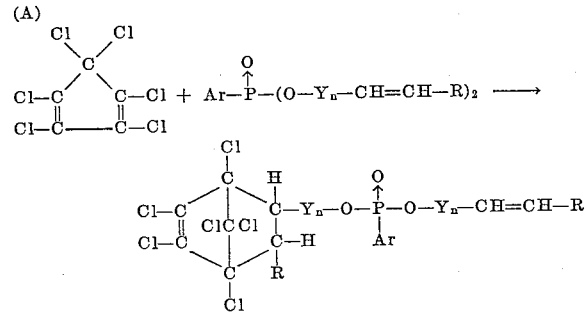

(B)
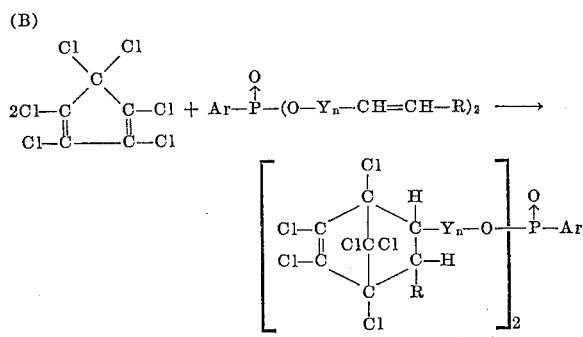

In the above formulae, Ar represents an aromatic radical such as phenyl, naphthyl, phenanthryl, and anthryl, which radical can be unsubstituted or substituted with substituents which are unreactive with the hexachlorocyclopentadiene reactant, such as alkyl, aryl, chloro, bromo and nitro groups.

The alkenyl radical represented by $$-Y_n-CH=CH-R$$

can be straight or branched-chain, containing 2 or more, preferably 2 to 30, carbon atoms, with the ethylenic group —CH=CH— either in a terminal or internal position. Y represents a straight or branched-chain alkylene radical linking the ethylenic group to oxygen in the ester moiety of the arylphosphonate; and $n$ is 0 or 1. When the ethylenic group is in the terminal position in the alkenyl radical, R represents hydrogen. When the alkenyl radical contains only 2 carbon atoms, such as the vinyl group, $n$ is 0 and R is hydrogen.

Representative dialkenyl arylphosphonates are divinyl benzenephosphonate, diallyl benzenephosphonate, dibutenyl naphthalenephosphonate, dihexenyl phenanthrenephosphonate, dioleyl toluene phosphonate, diallyl-2,4,5-trimethyl phenylphosphonate, diheptenyl-4-bromo phenylphosphonate, didodecenyl-3-chloro phenylphosphonate, divinyl-3-nitro phenylphosphonate, diallyl-3-methyl-2,5,6-trichloro phenylphosphonate, dipentenyl-3,4-dichlorophenylphosphonate, dihexenyl-2,4,5-trimethyl-6-chloro phenylphosphonate, diallyl-4-phenyl benzenephosphonate.

The preparation of the novel arylphosphonates of this invention is effected by intermittently mixing the reactants and heating the reaction mixture at a temperature within the range of from about 85 to about 185° C., preferably from about 100 to about 150° C., for a period of time sufficient to effect formation of the phosphonate, which may be from about 2 to about 48 hours, preferably 6 to about 30 hours. The conversion can be carried out in the presence or absence of inorganic solvents.

The following examples illustrate the manner in which these adducts can be produced, which adducts are useful as polymerizable monomers and lubricating oil additives.

*Example 1*

A mixture of 16 ml. (0.1 mole) hexachlorocyclopentadiene and 23.6 g. (0.1 mole) diallyl benzenephosphonate was heated in a reaction flask at 125–135° C. for 8 hours. A substantially quantitative yield of a pale-red non-distillable oil, $n_D^{20}$ 1.5718 having the formula

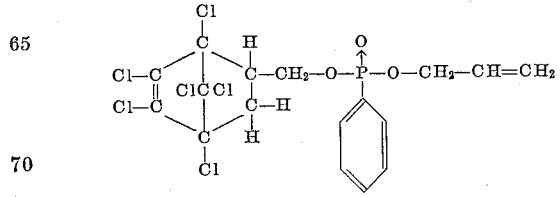

was obtained.

*Analysis.*—Calculated for $C_{17}H_{15}PO_3Cl_6$: Cl 41.6, P 6.07, molecular weight 511. Found: Cl 40.0, P 5.9.

*Example 2*

A mixture of 32 ml. (0.2 mole) of hexachlorocyclopentadiene and 23.6 g. (0.1 mole) of diallyl benzenephosphonate was heated in a reaction flask at 125–135° C. for 8 hours. A substantially quantitative yield of a red non-distillable oil, $n_D^{20}$ 1.5591, having the formula

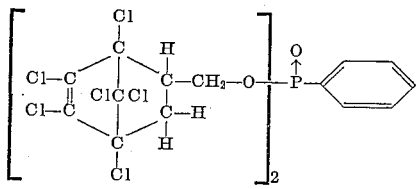

was obtained.

*Analysis.*—Calculated for $C_{22}H_{15}PO_3Cl_{12}$: Cl 54.2, P 3.96. Found: Cl 53.2, P 3.85.

The adduct of this example is especially useful as an additive for lubricating oils.

It has been found that arylphosphonates corresponding to Formula I above are especially useful as a polymerizable monomer for the preparation of fire-retardant polymeric materials, especially those interpolymeric materials obtained by the copolymerization of polymerizable monomeric compounds containing an ethylenic $>C=C<$ group.

Copolymerization can be performed by any method known to the art, especially wherein a catalyst is used that causes polymerization through the ethylenic groups present in the monomeric components. For example, to prepare an ethylene/arylphosphonate copolymer, ethylene may be reacted under pressure in an emulsion process with the arylphosphonate in the presence of a reduction-oxidation (redox) catalyst. The resulting copolymer, in the form of a latex, may be coagulated with a brine solution; the brine is removed by washing with water and alcohol and the copolymer is then dried. Such a process is disclosed more fully in U.S. Patent 2,703,794 to M. J. Roedel, which disclosure to the extent pertinent to the present invention is incorporated by reference. The process involves essentially polymerizing the polymerizable monomers in the presence of a reducing agent and an oxidizing agent, the agents being capable of generating a free radical by a reduction-oxidation reaction.

The polymerizable monomeric compounds suitable for use in preparing the fire-retardant polymeric materials can be any compound containing one or more ethylenic $>C=C<$ groups. Such compounds can be aliphatic hydrocarbons containing internal or terminal ethylenic groups, such as ethylene, propylene, butene, butadiene, pentene, hexene, octene, etc. Another class of polymerizable monomers are the mono- and polynuclear aralkenes having one or more ethylenic unsaturated hydrocarbyl groups as well as other unreactive substituents on the aromatic nucleus. Illustrative of such aralkenes are styrene, halo-styrenes and other vinyl aromatic compounds listed in Table 17–33, page 781 et seq. of "Styrene, Its Polymers, Copolymers and Derivatives" by Boundy and Boyer, published by Reinhold Publishing Corporation (1952); which list is incorporated herein by reference. The preferred aralkenes are the hydrocarbon and nuclear halogen-substituted vinyl aromatic compounds of the benzene series, especially styrene.

Other polymerizable monomers which can be used are acids, such as acrylic and methacrylic; nitriles, such as acrylonitrile and methacrylonitrile; vinyl esters, such as vinyl acetate, vinyl propionate and vinyl stearate; esters of unsaturated dibasic acids, such as dimethyl maleate and dibutyl fumarate; amides, such as acrylamides, methacrylamide, methylolacrylamide, and methylolmethacrylamide; hydroxy compounds such as ethylene glycol monoacrylate or monomethacrylate, glycerol monoacrylate or monomethacrylate or glycerol allyl ether; and vinyl alkyl ethers such as vinyl butyl ether, vinyl ethyl ether, vinyl hexyl ether, etc.

The polymerizable monomeric compound will ordinarily constitute a major proportion of the polymerizable mixture. The preferred ratio of the polymerizable monomer to the arylphosphonate containing hexachloronorbornene nucleus is at least 2 to 1, but may be as high as 50 to 1.

The preferred catalyst for use in polymerizing the arylphosphonate containing the hexachloronorbornene nucleus is the redox combination of potassium persulfate and sodium metabisulfite.

The resulting copolymers or interpolymers may be used directly in the formation of film, fibers and the like by processes well known to those skilled in the art. The polymers can be molded into objects, extruded as tubing, filaments, films, rods, etc. and melt cast or cast from suitable solvents to provide thin films and the like. Solutions of the polymers may be coated on paper, fabrics, or on films of other polymeric materials such as regenerated cellulose films to impart desirable properties to the thus coated base films.

*Example 3*

This example illustrates the preparation of a copolymer of styrene and an adduct of hexachlorocyclopentadiene and diallyl benzenephosphonate. To a 500 ml., round-bottomed, creased flask equipped with a paddle stirrer were added 10 g. of the styrene and diallyl benzenephosphonate adduct of Example 1, 30 g. of styrene, 0.4 g. of potassium persulfate, 0.2 g. of sodium meta-bisulfite, 0.2 g. of sodium oleate, and 80 g. of distilled water. The mixture was vigorously agitated at 25° C. for 4 hours. The copolymer was coagulated with an aqueous solution of 10% in sodium chloride. The liquid was decanted. The rubbery product was contacted with several portions of ethanol until it became friable. The product was washed several times with ethanol in a Waring Blendor, filtered, and dried at 90° C. under vacuum. The copolymer which weighed 18.9 g. was 87 percent by weight styrene. The chlorine content was 5.4% and the phosphorous percentage was 0.85%. A pellet formed at 180° C. under 4000 p.s.i.g. pressure was clear, tough and fire retardant.

The herein described interpolymers of the aryl phosphonates corresponding to Formula I and polymerizable monomeric compounds are being claimed in co-pending divisional application Serial No. 325,447, filed November 21, 1963.

Thus, having described the invention, what is claimed is:

1. A phosphonate of the group consisting of Formula I

I 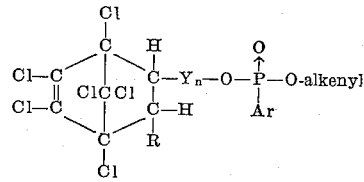

and Formula II

II 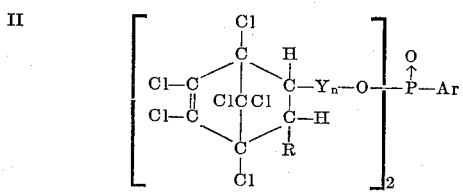

wherein Ar is an aromatic radical of the group consisting of phenyl, naphthyl, phenanthryl and anthryl radicals and such radicals substituted with lower alkyl, phenyl, chloro, bromo and nitro groups, R is from the group consisting of hydrogen and alkyl, Y is a divalent alkylene radical, and $n$ is an integer from 0 to 1.

2. A phosphonate having the formula

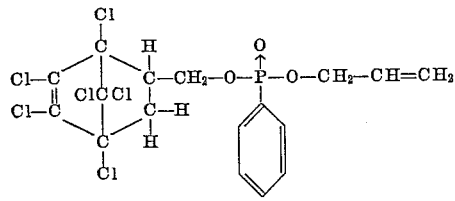

3. A phosphonate having the formula

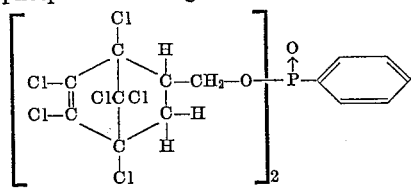

References Cited in the file of this patent
UNITED STATES PATENTS

| | | |
|---|---|---|
| 2,622,096 | Ladd et al. | Dec. 16, 1952 |
| 2,767,206 | Whetstone et al. | Oct. 16, 1956 |
| 2,809,187 | Chapin et al. | Oct. 8, 1957 |
| 2,881,196 | Fields | Apr. 7, 1959 |
| 2,894,938 | Chapin et al. | July 14, 1959 |
| 2,914,440 | Ultermohlen | Nov. 24, 1959 |
| 2,929,831 | Ackerman et al. | Mar. 22, 1960 |
| 2,956,073 | Whetstone et al. | Oct. 11, 1960 |